US012700693B2

(12) United States Patent
Liu et al.

(10) Patent No.: US 12,700,693 B2
(45) Date of Patent: Aug. 4, 2026

(54) MODULAR CONNECTOR WITH IMPROVED LOCKING FEATURES AND ASSEMBLY METHOD THEREOF

(71) Applicant: SPEED TECH CORPORATION, Taoyuan City (TW)

(72) Inventors: Chungpeng Liu, Taoyuan City (TW); Juehao Yu, Taoyuan City (TW); Hungchih Wu, Taoyuan City (TW)

(73) Assignee: SPEED TECH CORPORATION, Taoyuan City (TW)

( * ) Notice: Subject to any disclaimer, the term of this patent is extended or adjusted under 35 U.S.C. 154(b) by 566 days.

(21) Appl. No.: 18/211,843

(22) Filed: Jun. 20, 2023

(65) Prior Publication Data

US 2024/0204441 A1 Jun. 20, 2024

(30) Foreign Application Priority Data

Dec. 19, 2022 (CN) ........................ 202211632306.X

(51) Int. Cl.
*H01R 13/426* (2006.01)
*H01R 13/428* (2006.01)
*H01R 43/027* (2006.01)
*H01R 43/16* (2006.01)

(52) U.S. Cl.
CPC ......... *H01R 13/426* (2013.01); *H01R 13/428* (2013.01); *H01R 43/027* (2013.01); *H01R 43/16* (2013.01)

(58) Field of Classification Search
None
See application file for complete search history.

(56) References Cited

U.S. PATENT DOCUMENTS 4,620,762 A * 11/1986 Davis .................. H01R 13/665
439/945
5,326,281 A * 7/1994 Yin .................... H01R 13/6581
439/607.01
6,439,920 B1 8/2002 Chen
10,193,266 B1 * 1/2019 Lin ...................... H01R 13/502
(Continued)

FOREIGN PATENT DOCUMENTS

CN 1257331 A 6/2000
CN 2750516 Y 1/2006
(Continued)

*Primary Examiner* — Oscar C Jimenez
(74) *Attorney, Agent, or Firm* — Birch, Stewart, Kolasch & Birch, LLP

(57) ABSTRACT

A module connector includes an insulating body, a number of conductive terminals, a cable module and a metal shell. The insulating body includes a mating surface, an installation surface and an installation space extending through the installation surface. The cable module includes an insulating block and a number of cables fixed to the insulating block. The insulating block is received in the installation space. The cables are in electrical contact with the conductive terminals. The metal shell is fixed to the insulating body. The metal shell includes a stop elastic arm extending into the installation space. The insulating block includes a protrusion. The stop elastic arm is configured to abut against the protrusion so as to prevent the insulating block from exiting the installation space. An assembly method of the module connector is also disclosed.

18 Claims, 9 Drawing Sheets

(56) References Cited

U.S. PATENT DOCUMENTS

| | | | |
|---|---|---|---|
| 10,490,960 | B1 | 11/2019 | Wu |
| 2009/0163082 | A1 | 6/2009 | De Dios Martin et al. |
| 2011/0104934 | A1 | 5/2011 | Gutter et al. |
| 2011/0263151 | A1 | 10/2011 | Wang |
| 2014/0017926 | A1* | 1/2014 | Wu .................... H01R 13/6463 439/350 |
| 2020/0161817 | A1* | 5/2020 | Tanaka ................. H01R 13/658 |
| 2022/0302629 | A1 | 9/2022 | Brennan et al. |

FOREIGN PATENT DOCUMENTS

| | | | |
|---|---|---|---|
| CN | 201352640 | Y | 11/2009 |
| CN | 102819070 | A | 12/2012 |
| CN | 202977790 | U | 6/2013 |
| CN | 204834907 | U | 12/2015 |
| CN | 210723563 | U | 6/2020 |
| CN | 211088612 | U | 7/2020 |

* cited by examiner

MODULAR CONNECTOR WITH IMPROVED LOCKING FEATURES AND ASSEMBLY METHOD THEREOF

CROSS-REFERENCE TO RELATED APPLICATION

This patent application claims priority of a Chinese Patent Application No. 202211632306.X, filed on Dec. 19, 2022 and titled “MODULAR CONNECTOR AND ASSEMBLY METHOD THEREOF”, the entire content of which is incorporated herein by reference.

TECHNICAL FIELD

The present disclosure relates to a modular connector and an assembly method thereof, which belongs to a technical field of connectors.

BACKGROUND

A modular connector in the related art (such as an RJ 45 cable connector) usually includes an insulating body, a metal shell enclosing the insulating body, a plurality of cables mounted to the insulating body, and a plurality of conductive terminals fixed to the insulating body and electrically connected with the plurality of cables.

After repeated plugging and unplugging of the module connector into and from a mating connector (such as an RJ 45 receptacle connector), the cables are prone to loosening, thereby reducing the reliability thereof.

SUMMARY

An object of the present disclosure is to provide a highly reliable modular connector and an assembly method thereof.

In order to achieve the above object, the present disclosure adopts the following technical solution: a modular connector, including: an insulating body including a mating surface, an installation surface, a plurality of terminal receiving grooves extending through the mating surface, and an installation space extending through the installation surface; a plurality of conductive terminals installed in corresponding terminal receiving grooves, each conductive terminal including a mating portion exposed to the mating surface, the mating portion being configured to be in contact with a terminal of a mating connector; a cable module including an insulating block and a plurality of cables fixed to the insulating block, the insulating block being received in the installation space, the cables being in electrical contact with the conductive terminals; and a metal shell fixed to the insulating body, the metal shell including a stop elastic arm protruding into the installation space; wherein the insulating block includes a terminal mounting surface, a cable mounting surface, a plurality of slots extending through the terminal mounting surface, a plurality of cable installation grooves extending through the cable mounting surface, and a protrusion; the slots are arranged in alignment with corresponding terminal receiving grooves and communicate with each other; the cable installation grooves communicate with corresponding slots; and the stop elastic arm is configured to abut against the protrusion so as to prevent the insulating block from exiting the installation space.

In order to achieve the above object, the present disclosure adopts the following technical solution: a modular connector, including: an insulating body including a mating surface, an installation space and a plurality of terminal receiving grooves extending through the mating surface; a plurality of conductive terminals installed in corresponding terminal receiving grooves, each conductive terminal including a mating portion exposed to the mating surface, the mating portion being configured to be in contact with a terminal of a mating connector; a cable module including an insulating block and a plurality of cables fixed to the insulating block, the insulating block being assembled into the installation space along a first direction, the cables being in electrical contact with the conductive terminals; and a metal shell fixed to the insulating body, the metal shell including a stop elastic arm protruding into the installation space; wherein the insulating block includes a terminal mounting surface, a cable mounting surface, a plurality of slots extending through the terminal mounting surface, a plurality of cable installation grooves extending through the cable mounting surface, and a protrusion; the slots are arranged in alignment with corresponding terminal receiving grooves; the cable installation grooves communicate with corresponding slots; and a free end of the stop elastic arm is configured to abut against the protrusion along a second direction opposite to the first direction so as to prevent the insulating block from exiting the installation space along the second direction.

In order to achieve the above object, the present disclosure adopts the following technical solution: a method for assembling a modular connector, the module connector including: an insulating body including a mating surface, an installation surface, a plurality of terminal receiving grooves extending through the mating surface, and an installation space extending through the installation surface; a plurality of conductive terminals installed in corresponding terminal receiving grooves, each conductive terminal including a mating portion exposed to the mating surface, the mating portion being configured to be in contact with a terminal of a mating connector; a cable module including an insulating block and a plurality of cables fixed to the insulating block, the insulating block being received in the installation space, the cables being in electrical contact with the conductive terminals; and a metal shell fixed to the insulating body, the metal shell including a stop elastic arm protruding into the installation space; wherein the insulating block includes a terminal mounting surface, a cable mounting surface, a plurality of slots extending through the terminal mounting surface, a plurality of cable installation grooves extending through the cable mounting surface, and a protrusion; the slots are arranged in alignment with corresponding terminal receiving grooves and communicate with each other; the cable installation grooves communicate with corresponding slots; and the stop elastic arm is configured to abut against the protrusion so as to prevent the insulating block from exiting the installation space; the method including following steps: S1, providing the insulating body; S2, providing the metal shell, assembling and fixing the metal shell to the insulating body; S3, providing the insulating block, passing the cables in the cable installation grooves of the insulating block to form the cable module; S4, assembling the insulating block of the cable module in the installation space; wherein at an initial stage of assembling the insulating block, the protrusion of the insulating block presses the stop elastic arm; when the insulating block is assembled in place, the stop elastic arm rebounds, so that a free end of the stop elastic arm abuts against the protrusion to prevent the insulating block from exiting the installation space; and S5, providing the conductive terminals, assembling the conductive terminals in the terminal receiving grooves, and pressing the conductive terminals to pierce the cables so as to be in electrical contact with the cables.

Compared with the prior art, the present disclosure prevents the insulating block from exiting the installation space by providing the stop elastic arm to abut against the protrusion, thereby improving the reliability of the module connector.

DETAILED DESCRIPTION

Figure 1:
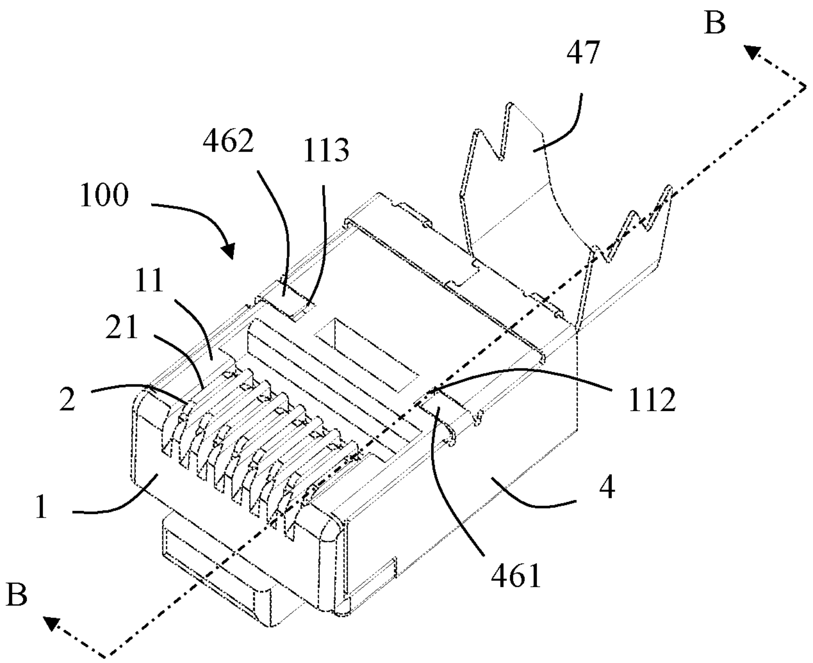
FIG. 1 is a schematic perspective view of a modular connector in accordance with an embodiment of the present disclosure, wherein cables are not shown.
Figure 2:
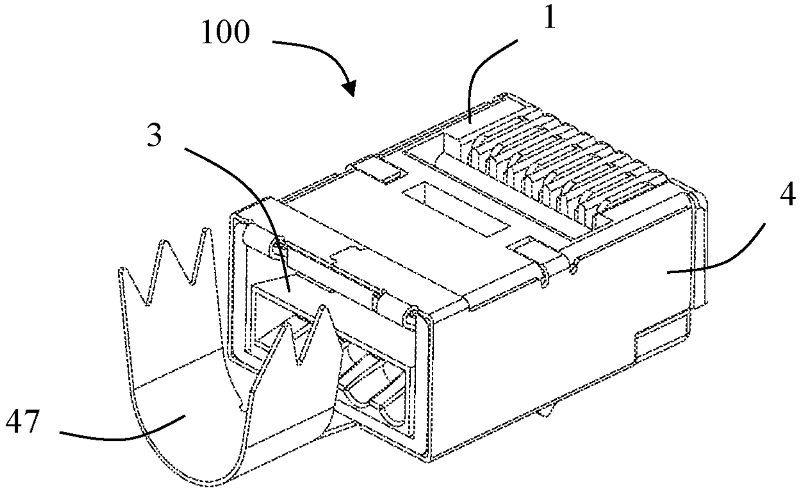
FIG. 2 is a schematic perspective view of FIG. 1 from another angle.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 9, the present disclosure discloses a modular connector 100, which includes an insulating body 1, a plurality of conductive terminals 2 assembled to the insulating body 1, a cable module 3 assembled to the insulating body 1, and a metal shell 4 fixed to the insulating body 1. In the illustrated embodiment of the present disclosure, the modular connector 100 is an RJ45 cable connector.

Figure 5:
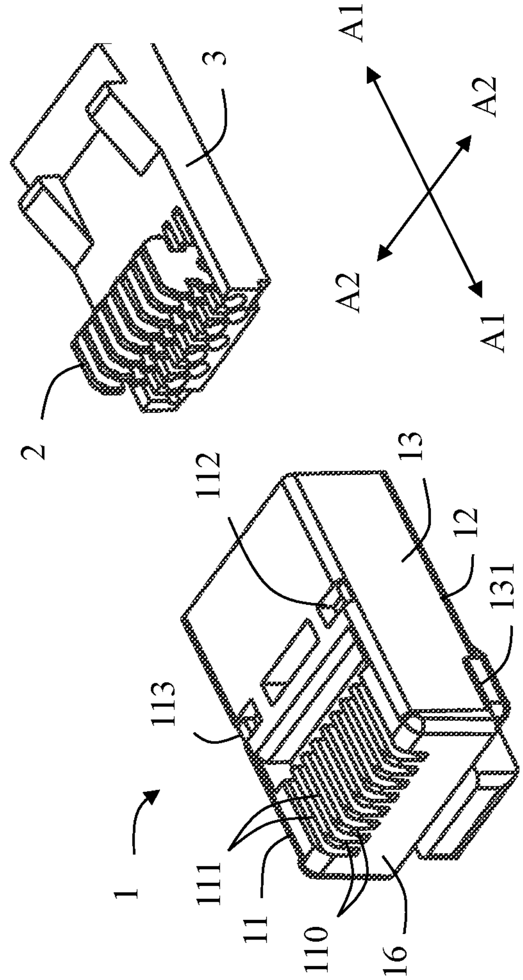
FIG. 5 is a further perspective exploded view after removing a metal shell in FIG. 3.
Figure 6:
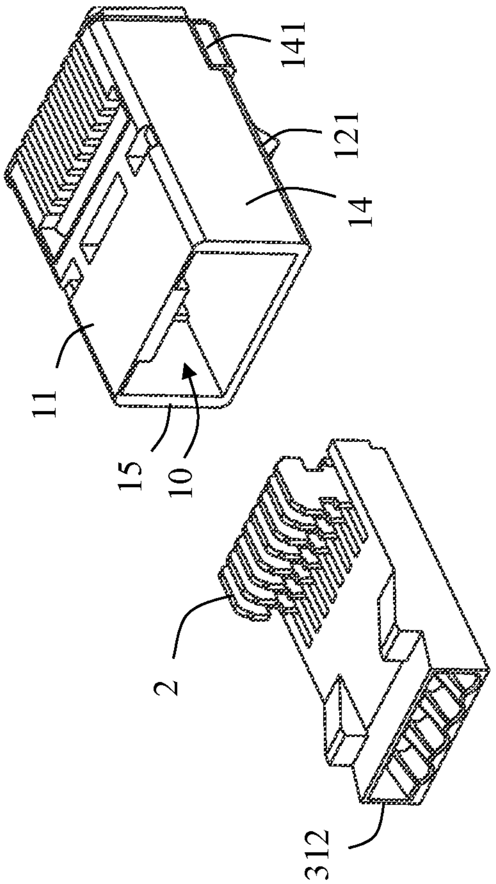
FIG. 6 is a partial perspective exploded view of FIG. 5 from another angle.

Referring to FIG. 5 and FIG. 6, in the embodiment shown in the present disclosure, the insulating body 1 includes a mating surface 11 (for example, an upper surface), a first surface 12 (for example, a lower surface) opposite to the mating surface 11, a first side wall 13, a second side wall 14 opposite to the first side wall 13, an installation surface 15 (for example, a rear surface), a second surface 16 (for example, a front surface) opposite to the installation surface 15, an installation space 10 extending through the installation surface 15, and a plurality of terminal receiving grooves 110 extending through the mating surface 11. Each terminal receiving groove 110 extends along a first direction A1-A1.

In the illustrated embodiment of the present disclosure, the insulating body 1 includes a plurality of partition portions 111 extending through the mating surface 11, and a plurality of terminal receiving grooves 110. Each terminal receiving groove 110 is formed between each two adjacent partition portions 111. The terminal receiving groove 110 extends upwardly through the mating surface 11 and forwardly through the second surface 16. In addition, the insulating body 1 further includes a first groove 112 and a second groove 113 recessed from the mating surface 11. The first groove 112 is adjacent to a top of the first side wall 13. The second groove 113 is adjacent to a top of the second side wall 14. In the first direction A1-A1, the first groove 112 and the second groove 113 are approximately located in the middle of the insulating body 1 so as not to weaken the structural strength of the insulating body 1 too much.

Figure 8:
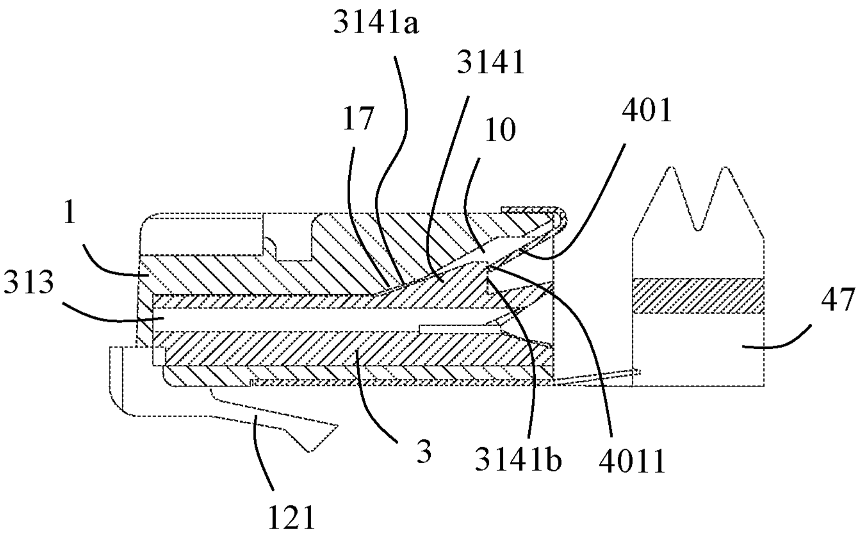
FIG. 8 is a schematic cross-sectional view taken along line B-B in FIG. 1.

Referring to FIG. 6 and FIG. 8, the insulating body 1 further includes a locking elastic arm 121 integrally extending from the first surface 12. The locking elastic arm 121 is configured to be locked with a notch of a mating connector (such as an RJ45 receptacle connector).

Referring to FIG. 5 and FIG. 6, the first side wall 13 includes a first positioning block 131 located adjacent to the second surface 16 and located at a corner of the first side wall 13.

Similarly, the second side wall 14 includes a second positioning block 141 located adjacent to the second surface 16 and located at a corner of the second side wall 14.

As shown in FIG. 8, the insulating body 1 further includes a guiding inclined surface 17 exposed in the installation space 10. The guiding inclined surface 17 makes the installation space 10 have a trumpet shape with an enlarged rear opening, so as to facilitate the installation of the cable module 3. The guiding inclined surface 17 is used to guide the insertion of the cable module 3.

Figure 7:
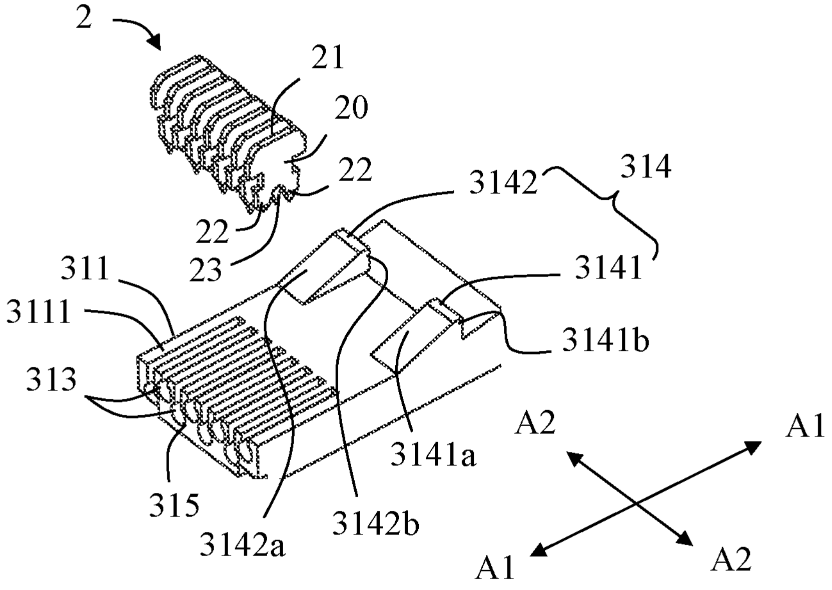
FIG. 7 is a perspective exploded view of conductive terminals and an insulating block.

Referring to FIG. 7, the conductive terminals 2 are installed in corresponding terminal receiving grooves 110. Each conductive terminal 2 includes a middle portion 20, a mating portion 21 extending upwardly from the middle portion 20, and at least one pointed portion 22 extending downwardly from the middle portion 20. The mating portion 21 is exposed on the mating surface 11. The mating portion 21 is configured to be in contact with a terminal of the mating connector. In the illustrated embodiment of the present disclosure, the mating portion 21 protrudes upwardly from the mating surface 11 to facilitate contact with the terminal of the mating connector. In the illustrated embodiment of the present disclosure, a width of the mating portion 21 along the first direction A1-A1 is greater than a width of the middle portion 20 along the first direction A1-A1. Therefore, increasing the width of the mating portion 21 as much as possible is beneficial to realize the reliability of mating with the mating connector. In the illustrated embodiment of the present disclosure, two pointed portions 22 are provided and arranged at intervals along the first direction A1-A1. The conductive terminal 2 includes a notch 23 located between the two pointed portions 22. The pointed portions 22 are configured to pierce the cable so as to contact the cable. By providing two pointed portions 22, it is beneficial to improve the success rate of piercing the cable. It is understandable to those skilled in the art that the technical term "pierce" used in the present disclosure refers to piercing an insulation layer of the cable, so that the pointed portion 22 can interfere with a conductive core of the cable.

Figure 9:
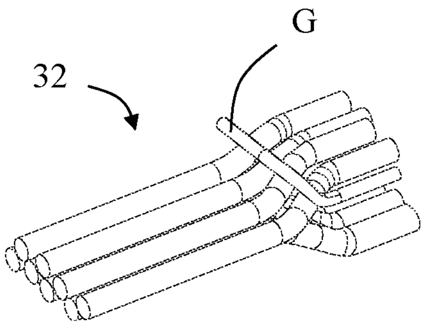
FIG. 9 is a schematic perspective view of a plurality of cables in accordance with an embodiment of the present disclosure.

Referring to FIG. 7 to FIG. 9, the cable module 3 includes an insulating block 31 and a plurality of cables 32 installed on the insulating block 31. The insulating block 31 is received in the installation space 10. The cables 32 are in electrical contact with corresponding conductive terminals 2.

In the illustrated embodiment of the present disclosure, the insulating block 31 includes a terminal mounting surface 311, a cable mounting surface 312, a plurality of slots 3111 extending upwardly through the terminal mounting surface 311, a plurality of cable installation grooves 313 extending through the cable mounting surface 312 backwardly along the first direction A1-A1, and a protrusion 314. The slots 3111 are arranged in alignment with corresponding terminal receiving grooves 110 along a vertical direction and communicate with each other. The cable installation grooves 313 communicate with corresponding slots 3111. The cable installation grooves 313 extend forwardly through a front end surface 315 of the insulating block 31 along the first direction A1-A1. In the illustrated embodiment of the present disclosure, the cable installation grooves 313 are arranged at intervals and staggered along a second direction A2-A2. The second direction A2-A2 is perpendicular to the first direction A1-A1. In other words, the cable installation grooves 313 are roughly arranged in two rows staggered along the vertical direction. With such arrangement, the purpose of arranging more cables 32 can be achieved by making full use of the volume of the insulating block 31.

In the illustrated embodiment of the present disclosure, the protrusion 314 includes a first protrusion 3141 and a second protrusion 3142. The first protrusion 3141 has a first inclined surface 3141*a* and a first stop surface 3141*b*. In the illustrated embodiment of the present disclosure, the first stop surface 3141*b* is a vertical surface located at a rear end of the first protrusion 3141.

Similarly, the second protrusion 3142 has a second inclined surface 3142*a* and a second stop surface 3142*b*. In the illustrated embodiment of the present disclosure, the second stop surface 3142 *b* is a vertical surface located at a rear end of the second protrusion 3142.

The first inclined surface 3141*a* and the second inclined surface 3142*a* are configured to mate with the guiding inclined surface 17.

Figure 3:
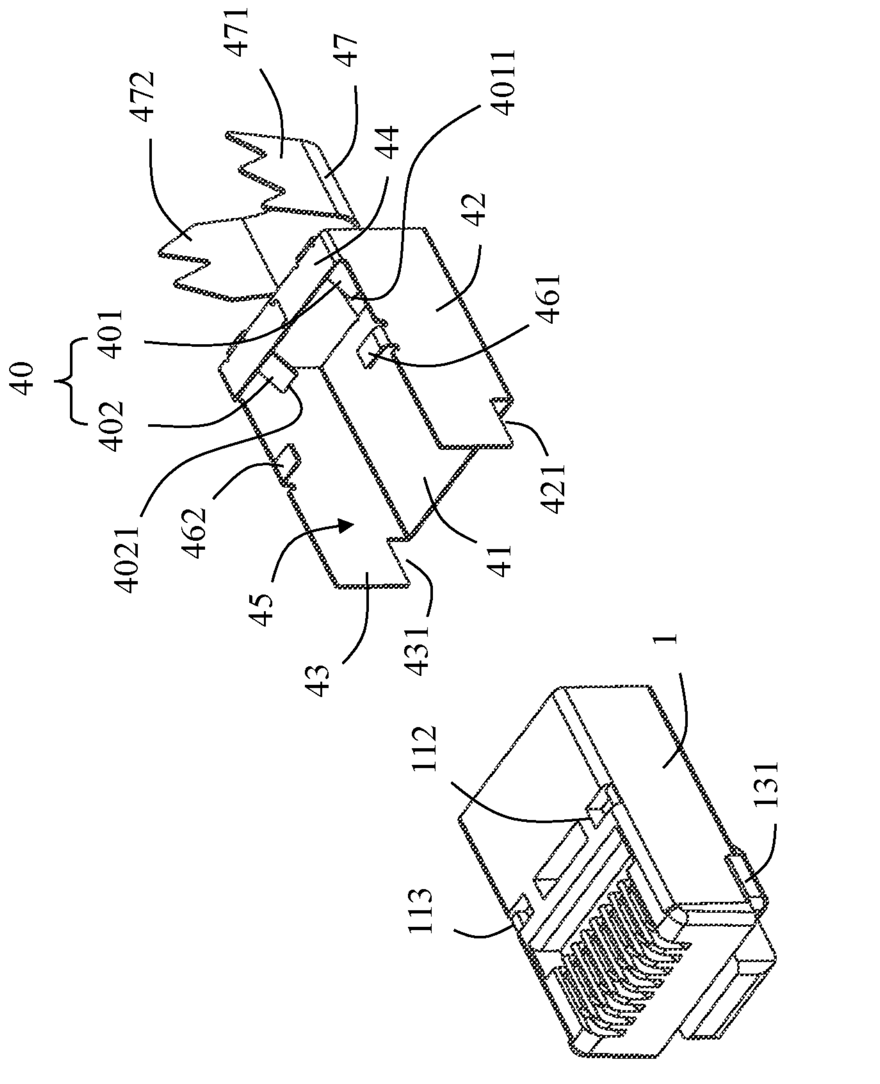
FIG. 3 is a partial perspective exploded view of FIG. 1.
Figure 4:
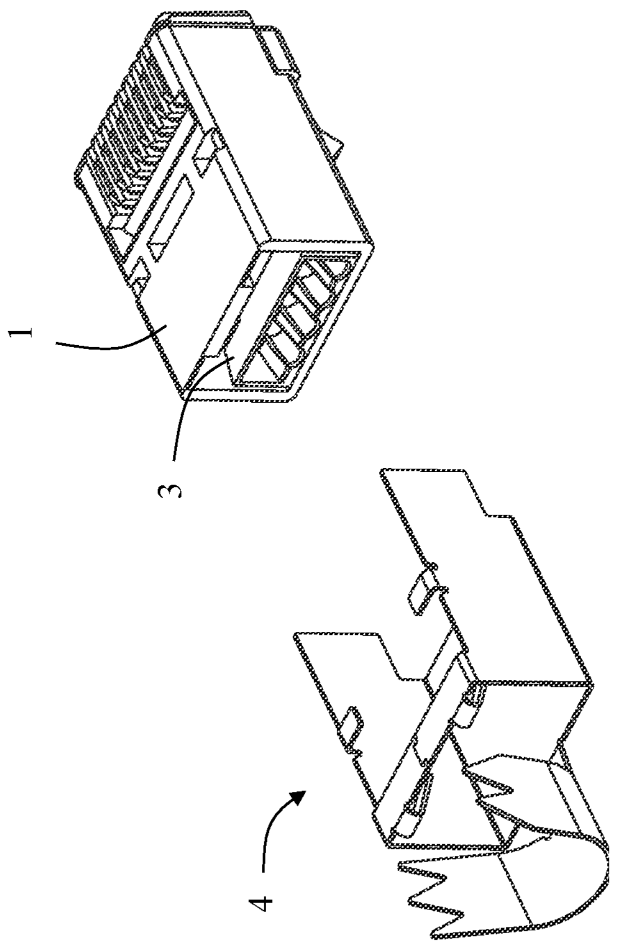
FIG. 4 is a partial perspective exploded view of FIG. 3 from another angle.

Referring to FIG. 3 and FIG. 4, the metal shell 4 is fixed to the insulating body 1. The metal shell 4 includes a stop elastic arm 40 protruding obliquely into the installation space 10. The stop elastic arm 40 is configured to abut against the protrusion 314 so as to prevent the insulating block 31 from exiting the installation space 10 backwardly along the first direction A1-A1.

Specifically, in the illustrated embodiment of the present disclosure, the metal shell 4 includes a first wall portion 41 (for example, a bottom wall), a first side wall portion 42, a second side wall portion 43 opposite to the first side wall portion 42, and a second wall portion 44 (for example, a top wall) connecting the first side wall portion 42 and the second side wall portion 43. In the illustrated embodiment of the present disclosure, the metal shell 4 is formed by stamping, bending and buckling a metal sheet. A dovetail groove and a dovetail protrusion for interlocking are located on the second wall portion 44. A top of the metal shell 4 defines an opening 45 located in front of the second wall portion 44. The mating portion 21 of the conductive terminal 2 is exposed in the opening 45. After the metal shell 4 is assembled on the insulating body 1, the first wall portion 41 leans against the first surface 12, the first side wall portion 42 leans against the first side wall 13, the second side wall portion 43 leans against the second side wall 14, and the second wall portion 44 leans against the mating surface 11.

The first side wall portion 42 defines a first notch 421 at a front end thereof. The first notch 421 matches with the first positioning block 131. The second side wall portion 43 defines a second notch 431 at a front end thereof. The second notch 431 matches with the second positioning block 141.

The metal shell 4 is provided with a first locking tab 461 bent from the first side wall 42 and a second locking tab 462 is bent from the second side wall portion 43. The first locking tab 461 is locked in the first groove 112. The second locking tab 462 is locked in the second groove 113. As a result, the metal shell 4 can be prevented from detaching from the insulating body 1 along the first direction A1-A1. By arranging the first groove 112 and the second groove 113 in the middle of the insulating body 1, it is beneficial to make full use of the part with higher structural strength of the insulating body 1 and further improve the fixation between the metal shell 4 and the insulating body 1.

In the illustrated embodiment of the present disclosure, the stop elastic arm 40 is integrally extended from the second wall portion 43. The stop elastic arm 40 includes a first elastic arm 401 and a second elastic arm 402. A free end 4011 of the first elastic arm 401 abuts against the first stop surface 3141*b*. A free end 4021 of the second elastic arm 402 abuts against the second stop surface 3142*b*.

Besides, the metal shell 4 includes a clip 47. In the illustrated embodiment of the present disclosure, the clip 47 is integrally extended with the first wall portion 41. The clip 47 includes a first buckle portion 471 and a second buckle portion 472. The first buckle portion 471 and the second buckle portion 472 are bent and buckled together to fix the cables 32. In the illustrated embodiment of the present disclosure, the cables 32 include a ground cable G. The ground cable G is in contact with the clip 47 for grounding purpose. Preferably, the clip 47 fixes the ground cable G inside. A portion of the ground cable G fixed to the clip 47 may extend along the first direction A1-A1, or extend along the second direction A2-A2, or extend at any angle, which is not limited in the present disclosure.

The present disclosure also discloses a method of assembling the modular connector 100, and the method includes the following steps:

S1, providing the insulating body 1;

S2, providing the metal shell 4, and assembling and fixing the metal shell 4 to the insulating body 1;

S3, providing the insulating block 31, passing the cables 32 in the cable installation grooves 313 of the insulating block 31 to form the cable module 3;

S4, assembling the insulating block 31 of the cable module 3 in the installation space 10; wherein at an initial stage of assembling the insulating block 31, the protrusion 314 of the insulating block 31 presses the stop elastic arm 40; when the insulating block 31 is assembled in place, the stop elastic arm 40 rebounds, so that a free end of the stop elastic arm 40 abuts against the protrusion 314 to prevent the insulating block 31 from exiting the installation space 10 backwardly along the first direction A1-A1; and S5, providing the conductive terminals 2, assembling the conductive terminals 2 in the terminal receiving grooves 110; and pressing the conductive terminals 2 to make the conductive terminals 2 pierce the cables 32 to be in electrical contact with the cables 32.

In the step S2, the first locking tab 461 is locked in the first groove 112, and the second locking tab 462 is locked in the second groove 113, so as to realize the assembly and fixation of the metal shell 4 and the insulating body 1.

In the step S3, parts of the cables 32 protruding beyond the front end surface 315 of the insulating block 31 are cut off.

It is understandable to those skilled in the art that in the method for assembling the modular connector 100 described in the present disclosure, the sequence of relevant steps can be adjusted as required.

Compared with the prior art, the present disclosure prevents the insulating block 31 from exiting the installation space 10 by providing the stop elastic arm 40 to abut against the protrusion 314, thereby improving the reliability of the module connector 100.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A modular connector, comprising:

an insulating body comprising a mating surface, an installation surface, a plurality of terminal receiving grooves extending through the mating surface, and an installation space extending through the installation surface;

a plurality of conductive terminals installed in corresponding terminal receiving grooves, each conductive terminal comprising a mating portion exposed to the mating surface, the mating portion being configured to be in contact with a terminal of a mating connector;

a cable module comprising an insulating block and a plurality of cables fixed to the insulating block, the insulating block being received in the installation space, the cables being in electrical contact with the conductive terminals; and a metal shell fixed to the insulating body, the metal shell comprising a stop elastic arm protruding into the installation space;

wherein the insulating block comprises a terminal mounting surface, a cable mounting surface, a plurality of slots extending through the terminal mounting surface, a plurality of cable installation grooves extending through the cable mounting surface, and a protrusion; the slots are arranged in alignment with corresponding terminal receiving grooves and communicate with each other; the cable installation grooves communicate with corresponding slots; and the stop elastic arm is configured to abut against the protrusion so as to prevent the insulating block from exiting the installation space;

wherein the protrusion comprises a first protrusion and a second protrusion, the first protrusion is provided with a first stop surface, and the second protrusion is provided with a second stop surface; and wherein the stop elastic arm comprises a first elastic arm and a second elastic arm, a free end of the first elastic arm abuts against the first stop surface, and a free end of the second elastic arm abuts against the second stop surface.

2. The modular connector according to claim 1, wherein the insulating body comprises a first side wall, a second side wall opposite to the first side wall, and a first surface opposite to the mating surface;

wherein the metal shell comprises a first wall portion, a first side wall portion, a second side wall portion opposite to the first side wall portion, and a second wall portion connecting the first side wall portion and the second side wall portion; and wherein the first wall portion leans against the first surface; the first side wall portion leans against the first side wall; the second side wall portion leans against the second side wall;

and the second wall portion leans against the mating surface.

3. The modular connector according to claim 2, wherein the stop elastic arm integrally extends from the second wall portion.

4. The modular connector according to claim 2, wherein the insulating body defines a first groove and a second groove which are recessed from the mating surface; the metal shell is provided with a first locking tab bent from the first side wall and a second locking tab bent from the second side wall; the first locking tab is locked in the first groove; and the second locking tab is locked in the second groove.

5. The modular connector according to claim 1, wherein the insulating body is provided with a guiding inclined surface exposed in the installation space; and the protrusion is provided with an inclined surface matched with the guiding inclined surface.

6. The module connector according to claim 1, wherein each conductive terminal comprises a pointed portion opposite to the mating portion, and the pointed portion is configured to pierce a corresponding cable so as to be in contact with the corresponding cable.

7. The modular connector of claim 1, wherein the plurality of cables comprise a ground cable; the metal shell comprises a clip, and the clip comprises a first buckle portion and a second buckle portion; wherein the first buckle portion and the second buckle portion are bent and buckled together to fix the cables; and the ground cable is in contact with the clip.

8. The modular connector according to claim 1, wherein the insulating body comprises a second surface opposite to the installation surface, and the cable installation grooves extend through the second surface.

9. A modular connector, comprising:

an insulating body comprising a mating surface, an installation space and a plurality of terminal receiving grooves extending through the mating surface;

a plurality of conductive terminals installed in corresponding terminal receiving grooves, each conductive terminal comprising a mating portion exposed to the mating surface, the mating portion being configured to be in contact with a terminal of a mating connector;

a cable module comprising an insulating block and a plurality of cables fixed to the insulating block, the insulating block being assembled into the installation space along a first direction, the cables being in electrical contact with the conductive terminals; and a metal shell fixed to the insulating body, the metal shell comprising a stop elastic arm protruding into the installation space;

wherein the insulating block comprises a terminal mounting surface, a cable mounting surface, a plurality of slots extending through the terminal mounting surface, a plurality of cable installation grooves extending through the cable mounting surface, and a protrusion; the slots are arranged in alignment with corresponding terminal receiving grooves; the cable installation grooves communicate with corresponding slots; and a free end of the stop elastic arm is configured to abut against the protrusion along a second direction opposite to the first direction so as to prevent the insulating block from exiting the installation space along the second direction;

wherein the protrusion comprises a first protrusion and a second protrusion, the first protrusion is provided with a first stop surface, and the second protrusion is provided with a second stop surface; and wherein the stop elastic arm comprises a first elastic arm and a second elastic arm, a free end of the first elastic arm abuts against the first stop surface along the second direction, and a free end of the second elastic arm abuts against the second stop surface along the second direction.

10. The modular connector according to claim 9, wherein the insulating body comprises a first side wall, a second side wall opposite to the first side wall, and a first surface opposite to the mating surface;

wherein the metal shell comprises a first wall portion, a first side wall portion, a second side wall portion opposite to the first side wall portion, and a second wall portion connecting the first side wall portion and the second side wall portion; and wherein the first wall portion leans against the first surface; the first side wall portion leans against the first side wall; the second side wall portion leans against the second side wall; and the second wall portion leans against the mating surface.

11. The modular connector according to claim 10, wherein the stop elastic arm integrally extends from the second wall portion.

12. The modular connector according to claim 10, wherein the insulating body defines a first groove and a second groove which are recessed from the mating surface; the metal shell is provided with a first locking tab bent from the first side wall and a second locking tab bent from the second side wall; the first locking tab is locked in the first groove; and the second locking tab is locked in the second groove.

13. The modular connector according to claim 9, wherein the insulating body is provided with a guiding inclined surface exposed in the installation space; and the protrusion is provided with an inclined surface matched with the guiding inclined surface.

14. The module connector according to claim 9, wherein each conductive terminal comprises a pointed portion opposite to the mating portion, and the pointed portion is configured to pierce a corresponding cable so as to be in contact with the corresponding cable.

15. The modular connector of claim 9, wherein the plurality of cables comprise a ground cable; the metal shell comprises a clip, and the clip comprises a first buckle portion and a second buckle portion; wherein the first buckle portion and the second buckle portion are bent and buckled together to fix the cables; and the ground cable is in contact with the clip.

16. A method for assembling a modular connector, the module connector comprising:

an insulating body comprising a mating surface, an installation surface, a plurality of terminal receiving grooves extending through the mating surface, and an installation space extending through the installation surface;

a plurality of conductive terminals installed in corresponding terminal receiving grooves, each conductive terminal comprising a mating portion exposed to the mating surface, the mating portion being configured to be in contact with a terminal of a mating connector;

a cable module comprising an insulating block and a plurality of cables fixed to the insulating block, the insulating block being received in the installation space, the cables being in electrical contact with the conductive terminals; and a metal shell fixed to the insulating body, the metal shell comprising a stop elastic arm protruding into the installation space;

wherein the insulating block comprises a terminal mounting surface, a cable mounting surface, a plurality of slots extending through the terminal mounting surface, a plurality of cable installation grooves extending through the cable mounting surface, and a protrusion; the slots are arranged in alignment with corresponding terminal receiving grooves and communicate with each other; the cable installation grooves communicate with corresponding slots; and the stop elastic arm is configured to abut against the protrusion so as to prevent the insulating block from exiting the installation space;

the method comprising following steps:

S1, providing the insulating body;

S2, providing the metal shell, assembling and fixing the metal shell to the insulating body;

S3, providing the insulating block, passing the cables in the cable installation grooves of the insulating block to form the cable module;

S4, assembling the insulating block of the cable module in the installation space; wherein at an initial stage of assembling the insulating block, the protrusion of the insulating block presses the stop elastic arm; when the insulating block is assembled in place, the stop elastic arm rebounds, so that a free end of the stop elastic arm abuts against the protrusion to prevent the insulating block from exiting the installation space; and S5, providing the conductive terminals, assembling the conductive terminals in the terminal receiving grooves, and pressing the conductive terminals to pierce the cables so as to be in electrical contact with the cables;

wherein the protrusion comprises a first protrusion and a second protrusion, the first protrusion is provided with a first stop surface, and the second protrusion is provided with a second stop surface; and wherein the stop elastic arm comprises a first elastic arm and a second elastic arm, a free end of the first elastic arm abuts against the first stop surface, and a free end of the second elastic arm abuts against the second stop surface.

17. The method for assembling the modular connector according to claim 16, wherein the insulating body defines a first groove and a second groove which are recessed from the mating surface; the metal shell is provided with a first locking tab bent from the first side wall and a second locking tab bent from the second side wall; and wherein in step S2, the first locking tab is locked in the first groove, and the second locking tab is locked in the second groove.

18. The method for assembling the modular connector according to claim 16, wherein in step S3, parts of the cables protruding beyond a front end surface of the insulating block are cut off.

* * * * *